(12) United States Patent
Shahidi et al.

(10) Patent No.: US 8,503,430 B2
(45) Date of Patent: Aug. 6, 2013

(54) DYNAMIC OPERATIONAL MODE MANAGEMENT FOR A WIRELESS TERMINAL

(75) Inventors: Reza Shahidi, San Diego, CA (US); Deepak Khandelwal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1248 days.

(21) Appl. No.: 11/562,382

(22) Filed: Nov. 21, 2006

(65) Prior Publication Data

US 2008/0117859 A1 May 22, 2008

(51) Int. Cl.
*H04L 12/66* (2006.01)
*H04W 36/00* (2009.01)

(52) U.S. Cl.
USPC ........ 370/352; 370/332; 455/443; 455/432.2; 455/456.6

(58) Field of Classification Search
USPC ......... 370/338, 331, 332, 335, 342, 352–356; 455/456.6, 432.2, 414.1, 414.4, 436–443, 455/44, 445, 432.1
See application file for complete search history.

(56) References Cited

U.S. PATENT DOCUMENTS

| | | | | |
|---|---|---|---|---|
| 4,811,380 | A * | 3/1989 | Spear | 455/437 |
| 6,879,584 | B2 * | 4/2005 | Thro et al. | 370/352 |
| 2003/0152044 | A1 | 8/2003 | Turner | |
| 2005/0037758 | A1 * | 2/2005 | Rimoni | 455/436 |
| 2005/0047399 | A1 | 3/2005 | Lee | |
| 2005/0048982 | A1 * | 3/2005 | Roland et al. | 455/449 |
| 2005/0188113 | A1 * | 8/2005 | Lee et al. | 709/249 |
| 2006/0126564 | A1 * | 6/2006 | Ramanna et al. | 370/331 |
| 2006/0209801 | A1 | 9/2006 | Joshi | |
| 2007/0153986 | A1 * | 7/2007 | Bloebaum et al. | 379/45 |
| 2007/0274217 | A1 * | 11/2007 | Long et al. | 370/235 |
| 2007/0280160 | A1 * | 12/2007 | Kim et al. | 370/331 |
| 2010/0022243 | A1 * | 1/2010 | Oommen et al. | 455/435.3 |

FOREIGN PATENT DOCUMENTS

| | | |
|---|---|---|
| EP | 1686828 | 8/2006 |
| JP | 2006087092 A | 3/2006 |
| JP | 2006217086 A | 8/2006 |
| JP | 2008252335 A | 10/2008 |
| WO | WO2006110021 | 10/2006 |

OTHER PUBLICATIONS

International Search Report—PCT/US07/085300, International Search Authority—European Patent Office—Rijswijk-May 14, 2008.
Written Opinion—PCT/US07/085300, International Search Authority—European Patent Office—Munich—May 14, 2008.
Taiwan Search Report-TW096144136-TIPO-Jun. 27, 2011.

* cited by examiner

*Primary Examiner* — Allahyar Kasraian
(74) *Attorney, Agent, or Firm* — Kevin T. Cheatham

(57) ABSTRACT

An operational mode of a terminal is dynamically configured to allow the terminal to receive services of interest to the terminal while potentially conserving battery power. The terminal operates in a first mode (e.g., an HRPD-only mode) and monitors only a first radio network (e.g., an HRPD network) for pages from a first data network (e.g., and IMS network) if all services from a second data network (e.g., an ANSI-41 network) of interest to the terminal is obtainable via the first radio network. The terminal operates in a second mode (e.g., an 1X-HRPD mode) and monitors the first radio network and a second radio network (e.g., a 1X network) for pages from the first and second data networks, respectively, if at least one service from the second data network of interest to the terminal is not obtainable via the first radio network. The terminal may dynamically select the first or second mode.

37 Claims, 6 Drawing Sheets

DYNAMIC OPERATIONAL MODE MANAGEMENT FOR A WIRELESS TERMINAL

BACKGROUND

I. Field

The present disclosure relates generally to communication, and more specifically to techniques for operating a wireless terminal.

II. Background

Wireless communication networks are widely deployed to provide various communication services such as voice, data, video, broadcast, messaging, etc. These networks include multiple-access radio networks capable of supporting communication for multiple users by sharing the available radio resources. Examples of such radio networks include Code Division Multiple Access (CDMA) networks, Time Division Multiple Access (TDMA) networks, Frequency Division Multiple Access (FDMA) networks, and Orthogonal FDMA (OFDMA) networks. A CDMA network may implement a radio technology such as cdma2000, Wideband-CDMA (W-CDMA), etc. cdma2000 covers IS-2000, IS-95 and IS-856 standards. A TDMA network may implement a radio technology such as Global System for Mobile Communications (GSM). These various radio technologies and standards are known in the art.

Some radio networks can support voice and data services. One such radio network is a CDMA2000 1X network that implements IS-2000 and/or IS-95. A CDMA2000 1X network is also referred to as a 1X network, a CDMA network, etc. Voice and data services have different characteristics and requirements. For example, voice service typically requires a common grade of service (GoS) for all users and further imposes relatively stringent delay requirements. In contrast, data service may be able to tolerate different GoS for different users and variable delays. To support both voice and data services, the 1X network may first allocate radio resources to voice users and then allocate any remaining radio resources to data users who are able to tolerate longer delays.

Some radio networks are optimized for data service. One such radio network is a High Rate Packet Data (HRPD) network that implements IS-856. An HRPD network is also referred to as a CDMA2000 1xEV-DO network, a 1xEV-DO network, a 1x-DO network, an HDR network, etc. A data session typically has long periods of silence and sporadic bursts of traffic. The HRPD network allocates most or all of the radio resources to one user at any given moment, thereby greatly increasing the peak data rate for the user being served.

A service provider/network operator may deploy multiple radio networks to provide enhanced services for its subscribers. For example, the service provider may deploy a 1X network to support voice and data services for a large geographic area and may deploy an HRPD network to support data service for areas where data usage is expected to be high. The coverage areas of the two radio networks typically overlap. A terminal may be under the coverage of only the 1X network, or only the HRPD network, or both 1X and HRPD networks at any given moment. The terminal may be able to receive different services depending on its location and other factors.

SUMMARY

Techniques for operating a terminal in an efficient manner are described herein. In an aspect, the operational mode of the terminal is dynamically configured to allow the terminal to receive services of interest to the terminal while potentially conserving battery power. The terminal may be within the coverage of one or more radio networks and may be able to receive services from one or more data networks connected to the radio network(s). The terminal may select an operational mode from among multiple operational modes based on the services of interest to the terminal, the available radio and data networks, the capabilities of the available radio and data networks, etc.

In one design, the terminal operates in a first mode (e.g., an HRPD-only mode) and monitors only a first radio network (e.g., an HRPD network) for pages from a first data network (e.g., an IMS network) if all services from a second data network (e.g., an ANSI-41 network) of interest to the terminal is obtainable via the first radio network. The terminal operates in a second mode (e.g., a 1X-HRPD mode) and monitors the first radio network and a second radio network (e.g., a 1X network) for pages from the first and second data networks, respectively, if at least one service from the second data network of interest to the terminal is not obtainable via the first radio network. The terminal may dynamically select one of a plurality of modes comprising the first and second modes based on the capabilities of the radio and data networks received by the terminal, the services of interest to the terminal, the requirements of the services of interest, and/or other factors.

Various aspects and features of the disclosure are described in further detail below.

DETAILED DESCRIPTION

The techniques described herein may be used for various wireless communication networks such as CDMA, TDMA, FDMA, and OFDMA radio networks, wireless local area networks (WLANs), etc. The terms "network" and "system" are often used interchangeably. The techniques may also be used for various radio technologies such as cdma2000, W-CDMA, GSM, IEEE 802.11, etc. W-CDMA and GSM are described in documents from an organization named "3rd Generation Partnership Project" (3GPP). cdma2000 is described in documents from an organization named "3rd Generation Partnership Project 2" (3GPP2). 3GPP and 3GPP2 documents are publicly available. For clarity, the techniques are described below for 3GPP2-based networks, which include 1X and HRPD networks.

Figure 1:
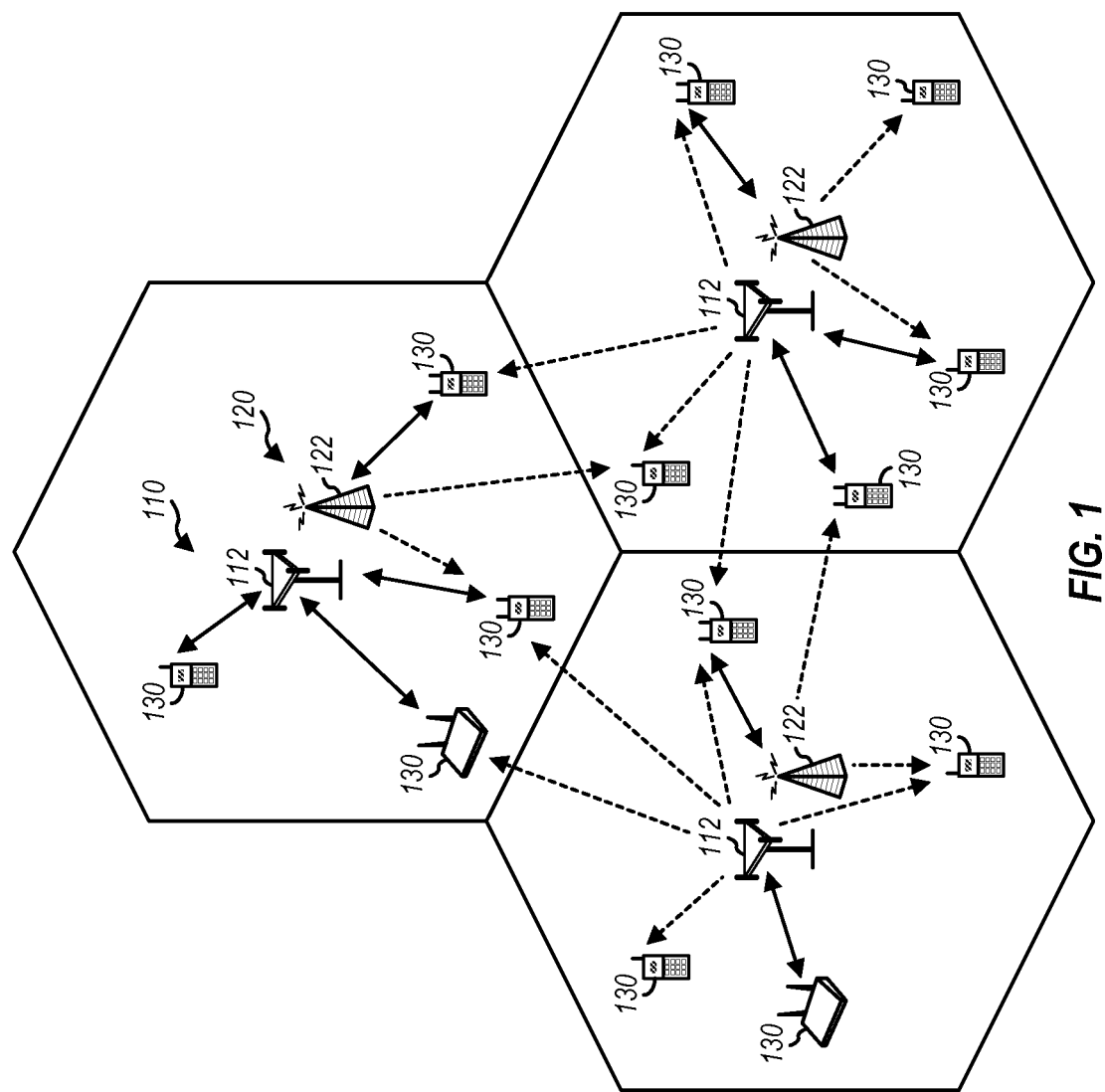
FIG. 1 shows a 1X network and an HRPD network.

FIG. 1 shows a deployment with a 1X network 110 and an HRPD network 120. The 1X network includes base stations 112 that support radio communication for terminals 130 located within the coverage of these base stations. Similarly, the HRPD network includes base stations 122 that support radio communication for terminals 130 located within the coverage of these base stations. Base stations 112 and 122 may be located at different sites or co-located at the same sites. In general, a base station (1X terminology) is a fixed station that communicates with the terminals and may also be called an access point (HRPD terminology), a Node B (3GPP terminology), a base transceiver station (BTS), etc.

A terminal may be stationary or mobile and may also be called a mobile station (1X terminology), an access terminal (HRPD terminology), a user equipment (3GPP terminology), a subscriber unit, a station, etc. A terminal may be a cellular phone, a personal digital assistant (PDA), a wireless communication device, a wireless modem, a laptop computer, etc. In the following description, the term "base station" is used generically for a fixed station, and the term "terminal" is used for a wireless device that communicates with the fixed station.

A terminal may communicate with one or multiple base stations on the forward link and/or reverse link at any given moment. The forward link (or downlink) refers to the communication link from the base stations to the terminals, and the reverse link (or uplink) refers to the communication link from the terminals to the base stations. In FIG. 1, a solid line with arrows on both ends indicates communication between a terminal and a base station. A dashed line with an arrow on one end indicates reception of pilot and/or signaling (e.g., pages) by a terminal from a base station.

Figure 2:
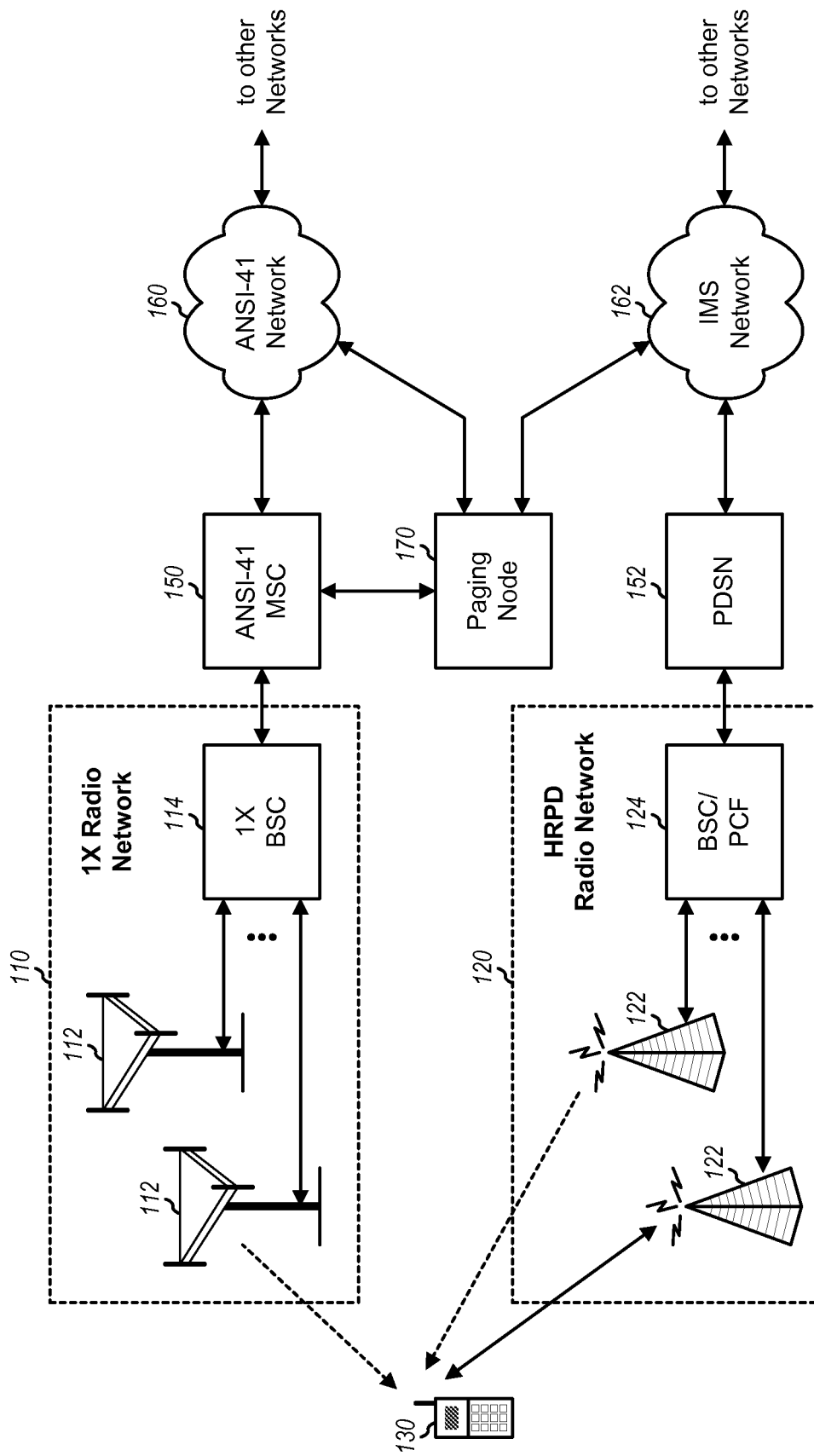
FIG. 2 shows network entities supporting the 1X and HRPD networks.

FIG. 2 shows a diagram of various network entities supporting the 1X and HRPD networks. For 1X, a Base Station Controller (BSC) 114 couples to base station 112 and provides coordination and control for these base stations. BSC 114 may handle allocation of traffic channels to terminals, control handoff of terminals, etc. A Mobile Switching Center (MSC) 150 couples to BSC 114 and supports circuit-switched (CS) communication for terminals. MSC 150 may provide routing for circuit-switched calls and perform mobility management for terminals located within the area served by the MSC. MSC 150 couples to an ANSI-41 network 160, which may provide various services such as voice, Short Message Service (SMS), location services (LCS), etc. ANSI-41 is a mobile networking protocol used for 3GPP2-based radio networks. ANSI-41 network 160 may couple to other networks such as a Public Switched Telephone Network (PSTN) that serves conventional telephones. ANSI-41 is described in a set of documents ANSI-41.1 through ANSI-41.6, entitled "Cellular Radiotelecommunications Intersystem Operations," which is publicly available from American National Standards Institute (ANSI).

For HRPD, a BSC/Packet Control Function (PCF) 124 couples to base stations 122 and controls the exchange of packet data between these base stations and a Packet Data Serving Node (PDSN) 152. PDSN 152 supports packet-switched communication for terminals. PDSN 152 may handle establishment, maintenance, and termination of PPP (Point-to-Point Protocol) sessions for the terminals, assign dynamic Internet Protocol (IP) addresses to the terminals, etc. PDSN 152 couples to an IP Multimedia Subsystem (IMS) network 162, which may provide various services such as voice, packet data, SMS, etc. IMS network 162 may couple to other public and/or private networks such as the Internet.

The 1X and HRPD networks support over-the-air communication and may also be referred to as radio networks (RNs), radio access networks (RANs), access networks (ANs), etc. The ANSI-41 and IMS networks support different communication services and may also be referred to as data networks, core networks, etc. The ANSI-41 network is a circuit-switched data network whereas the IMS network is a packet-switched data network. A paging node 170 couples to the ANSI-41 and IMS networks and supports paging for these data networks. Paging node 170 may receive pages for terminals that have registered with the ANSI-41 and/or IMS network. Paging node 170 routes pages for terminals registered with the ANSI-41 network to MSC 150 and routes pages for terminals registered with the IMS network to PDSN 152 for transmission to these terminals.

A terminal may be capable of communicating with the 1X network and/or HRPD network. Depending on its capability, the terminal is typically configured with a specific operating mode, which may be one of the following:

1X-only mode—monitor only 1X network,
HRPD-only mode—monitor only HRPD network, and
1X+HRPD mode—monitor both 1X and HRPD networks.

The 1X+HRPD mode may include (a) a simultaneous mode in which the terminal simultaneously receives the 1X and HRPD networks (e.g., using two receivers) and (b) a multiplexed mode in which the terminal receives the 1X and HRPD networks in a time division multiplexed (TDM) manner (e.g., using a single receiver). The terminal may be configured with (a) the 1X-only mode if it can communicate with only the 1X network, (b) the HRPD-only mode if it can communicate with only the HRPD network, or (c) the 1X+HRPD mode if it can communicate with both the 1X and HRPD networks. The mode configuration for the terminal is typically static, and the terminal operates in accordance with the configured mode. For example, if the terminal is configured with the 1X+HRPD mode, then the terminal monitors both the 1X and HRPD networks whenever these radio networks are available. The terminal may consume more power in order to monitor both radio networks.

In an aspect, the operational mode of a terminal is dynamically configured to allow the terminal to receive services of interest to the terminal while potentially conserving battery power. The 1X and ANSI-41 networks may support certain services, which are referred to as 1X services. The HRPD and IMS networks may support certain services, which are referred to as IMS services. The terminal may be interested in or may be capable of receiving certain services. In general, each service of interest may be obtained via only the 1X network, or only the HRPD network, or either the 1X or HRPD network. The terminal may select a suitable operational mode based on the services of interest to the terminal, the available radio and data networks, the capabilities of the available radio and data networks, etc.

Some services may be available via only the 1X network. These services may include location-based services, emergency services that utilize location information, etc. Other services may be obtained via either the 1X or HRPD network. The terminal may be able to receive a 1X service via the HRPD and IMS networks if (a) the HRPD network is capable of providing the required quality of service (QoS) for the service, (b) the IMS network provides the service, and (c) the terminal has proper subscription. For example, voice service may be obtained with either a circuit-switched call on the 1X network or a Voice-over-IP (VoIP) call on the HRPD network, if the HRPD network can provide the required QoS for voice.

HRPD Revision A (Rev A) supports QoS whereas HRPD Revision 0 (Rev 0) does not support QoS. An HRPD Rev A network may thus support services with QoS requirements, such as voice, whereas an HRPD Rev 0 network typically supports services with best effort. In much of the following description, an HRPD Rev 0 network may be considered as an HRPD Rev A network that cannot support all 1X services of interest to the terminal.

The terminal may register with the ANSI-41 network and may operate in an idle state when the terminal is not actively communicating with any base station in the 1X network. In the idle state, the terminal typically monitors a paging channel from the 1X network for messages applicable to the terminal. Such messages may include page messages that alert the terminal to the presence of an incoming call and overhead messages that carry system information and/or other information for the terminal. The terms "page messages" and "pages" are often used interchangeably. Alternatively or additionally, the terminal may register with the IMS network. In the idle state, the terminal typically monitors a control channel from the HRPD network for pages sent to the terminal. Pages are typically originated in a data network, routed to the proper radio network, and sent over the air to the terminals.

Figure 3:
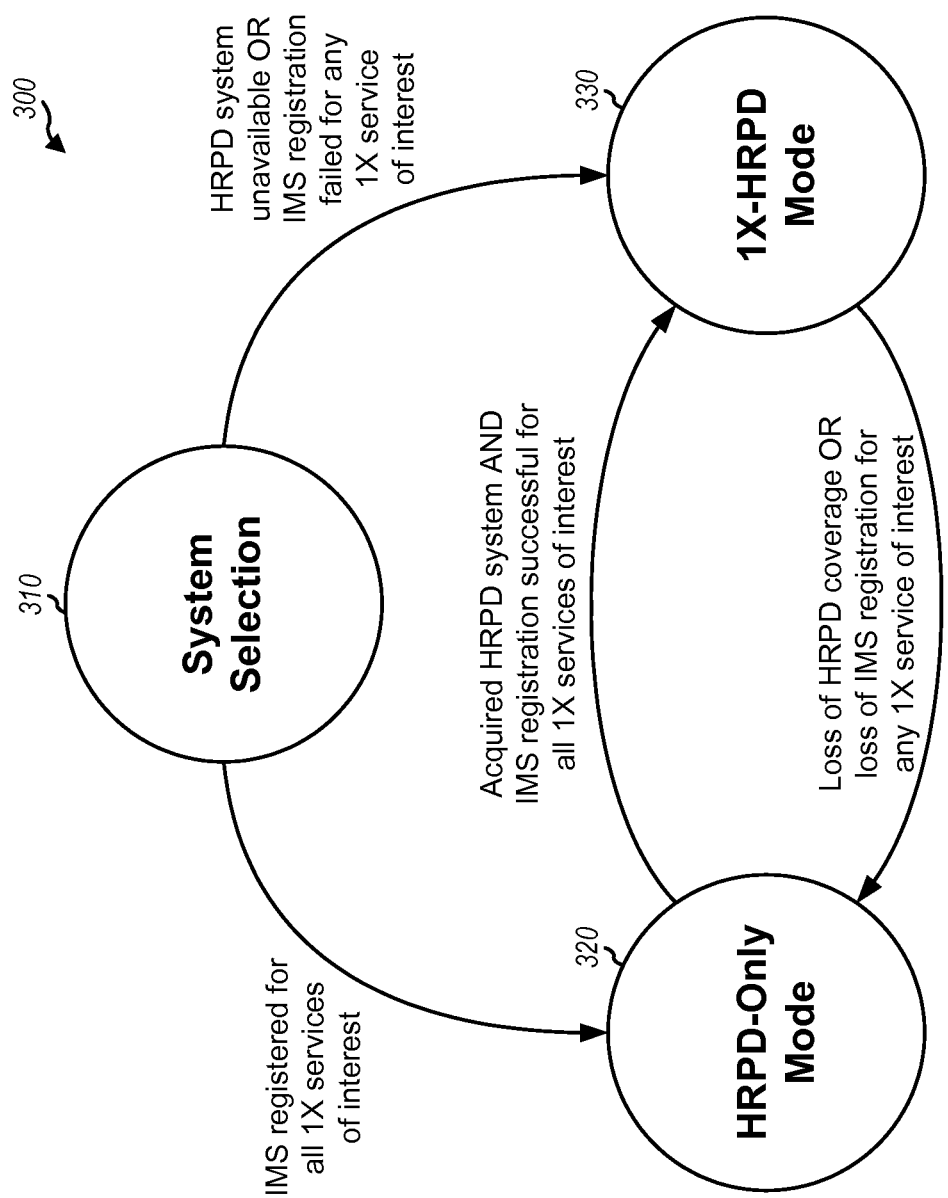
FIG. 3 shows a state diagram for a terminal.

FIG. 3 shows a design of a state diagram 300 for a terminal. The terms "operational mode", "mode" and "state" may be used interchangeably to indicate a particular manner of operation for a terminal. The terminal starts in a system selection state 310, e.g., at power up or upon loss of coverage. The terminal searches for radio networks and may acquire 1X and/or HRPD networks based on its preferred roaming list (PRL). If the terminal acquires an HRPD network, then the terminal determines whether the HRPD network supports all 1X services of interest to the terminal. This determination may be made by performing session negotiation or by using Session Initiation Protocol (SIP) registration, notify and/or other mechanism. SIP is a signaling protocol for initiating, modifying, and terminating interactive user sessions based on IP. The terminal may perform service-based registration and identify specific services of interest to the terminal and supported by the radio network received by the terminal. Thus, if the HRPD network can support all 1X services of interest, then the terminal may perform registration with the IMS network (or IMS registration) to obtain these 1X services via the HRPD network. The IMS registration may be via SIP or some other suitable protocol. The terminal transitions to an HRPD-only mode 320 if it successfully registers with the IMS network and can receive all 1X services of interest via the HRPD network. The terminal transitions to a 1X-HRPD mode 330 if it registers with the IMS network but cannot receive all 1X services of interest via the IMS network and/or it registers with the ANSI-41 network.

In HRPD-only mode 320, the terminal monitors only the HRPD network for pages and receives all services via the HRPD and IMS networks, possibly except for emergency calls. The terminal does not monitor the 1X network while in HRPD-only mode 320. If the terminal loses HRPD coverage or IMS registration for any 1X service of interest or if the terminal detects border conditions, then the terminal moves to 1X-HRPD mode 330. The border conditions are indicative of the terminal being near the edge of HRPD coverage and may be determined as described below.

In 1X-HRPD mode 330, the terminal monitors 1X and/or HRPD network for pages. If only 1X network is available, then the terminal may monitor a paging channel from the 1X network for pages and may search for a control channel from the HRPD network. If both 1X and HRPD networks are available, then the terminal may monitor paging channels from both radio networks if any 1X service of interest is not available via the IMS network. The terminal remains in 1X-HRPD mode 330 if the HRPD network is not available or if any 1X service of interest is not available via the IMS network.

The terminal may move from HRPD Rev A coverage to (a) HRPD Rev 0 and 1X coverage or (b) only 1X coverage. If the terminal monitors only the HRPD Rev A network in the HRPD-only mode, then the terminal may lose the HRPD Rev A network before it can acquire a new radio network. During this period, the terminal would not be able to receive pages from any radio network.

In an aspect, base stations in the HRPD Rev A network that are near the coverage edge of the HRPD Rev A network transmit overhead messages (e.g., SectorParameters messages) containing 1X neighbor lists. A 1X neighbor list for a given base station in the HRPD Rev A network may contain neighbor base stations in the 1X network. Reception of the 1X neighbor list may indicate that the terminal is near HRPD Rev A coverage edge. The terminal may use this information to start monitoring both 1X and HRPD networks and to perform 1X registration, IMS de-registration of 1X services, etc. This may allow for seamless paging of the terminal from the HRPD Rev A and 1X networks.

Figure 4:
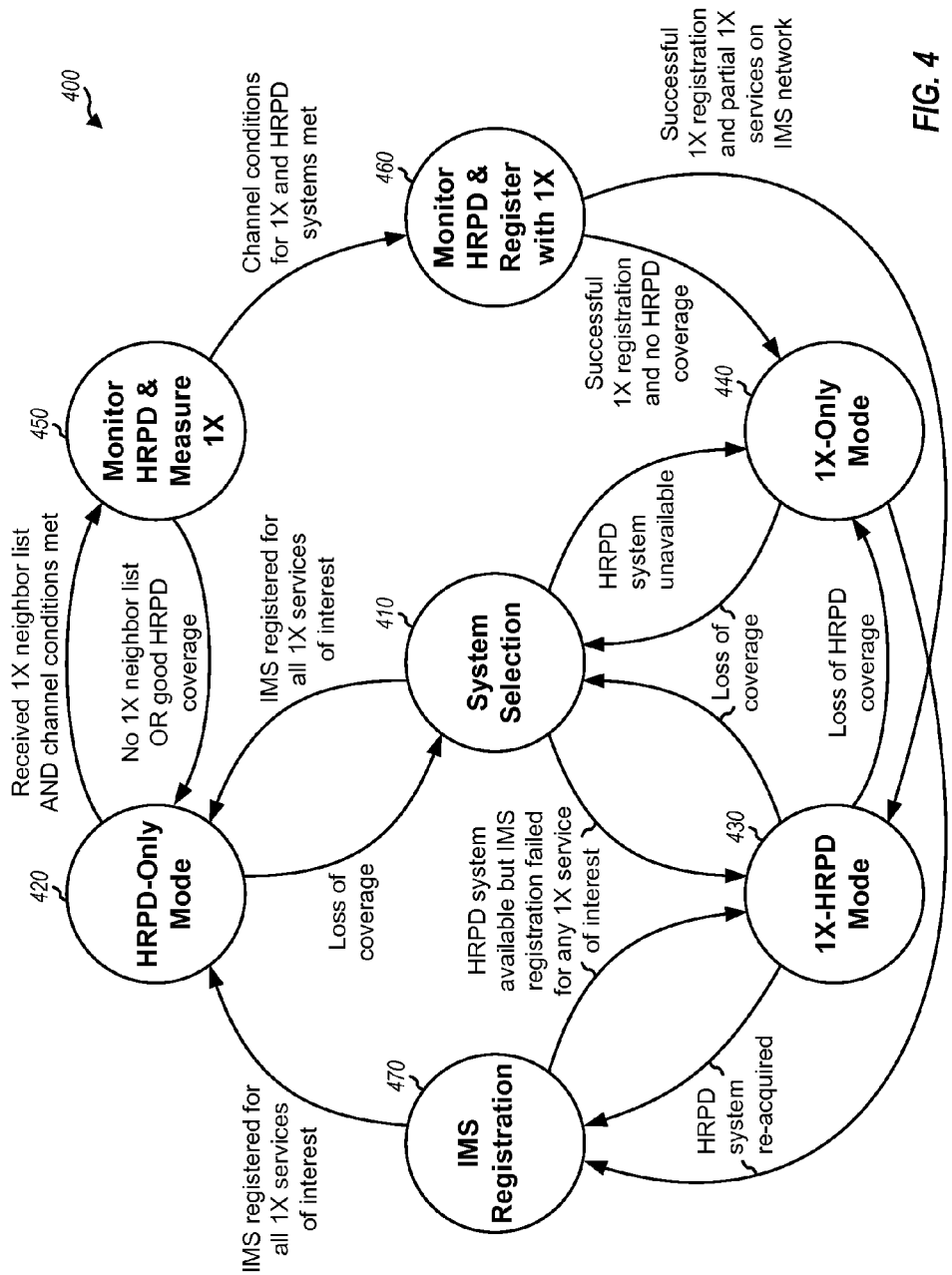
FIG. 4 shows another state diagram for a terminal.

FIG. 4 shows a design of a state diagram 400 for a terminal. The terminal starts in a system selection state 410, e.g., at power up or upon loss of coverage. The terminal searches for radio networks, acquires 1X and/or HRPD network, and performs system selection. The terminal transitions to an HRPD-only mode 420 if it acquires an HRPD network and successfully registers with the IMS network for all 1X services of interest. The terminal transitions to a 1X-HRPD mode 430 if it acquires both 1X and HRPD networks but all 1X services of interest is not available via the HRPD network. The terminal transitions to a 1X-only mode 440 if it acquires only a 1X network.

In HRPD-only mode 420, the terminal monitors only the HRPD network for pages and does not monitor the 1X network. If the terminal obtains a 1X neighbor list from a base station in the HRPD network and if certain border conditions are met, then the terminal transitions to a monitor HRPD and measure 1X state 450. The terminal transitions to system selection state 410 if it loses coverage of the HRPD network.

In state 450, the terminal continues to monitor the HRPD network and also makes pilot measurements for neighbor base stations in the 1X network. The terminal transitions to a monitor HRPD and register with 1X state 460 if the channel conditions for the 1X and HRPD networks are met.

In state 460, the terminal performs registration with the ANSI-41 network, or 1X registration. After successful 1X registration, the IMS network may deliver some or all of the 1X services via the 1X network. The terminal may keep track of the 1X services available from the IMS network while in this state. The terminal transitions to 1X-only mode 440 if 1X registration is successful and HRPD coverage is unavailable. The terminal transitions to 1X-HRPD mode 430 if 1X registration is successful and the HRPD network is available but not all 1X services of interest is available via the HRPD network.

In 1X-HRPD mode 430, the terminal monitors both the 1X and HRPD networks for pages. The terminal transitions to a 1X-only mode 440 if it loses HRPD coverage. The terminal transitions to system selection state 410 if it loses both 1X and HRPD coverage. The terminal transitions to an IMS registration state 470 if it reacquires HRPD and the channel conditions for 1X and HRPD networks are met.

In 1X-only mode 440, the terminal monitors the 1X network for pages and periodically searches for HRPD network. The terminal transitions to IMS registration state 470 if it re/acquires an HRPD network and the channel conditions for the 1X and HRPD networks are met. The terminal transitions to system selection state 410 if it loses 1X coverage.

In state 470, the terminal performs registration with the IMS network for all 1X services of interest. The terminal transitions to HRPD-only mode 420 if the IMS registration is successful for all 1X services of interest. The terminal transitions to 1X-HRPD mode 430 if it fails to register with the IMS network for any 1X service of interest.

FIGS. 3 and 4 show two example state diagrams for a terminal. Other state diagrams with fewer, more, or different states and modes may also be used.

In general, a terminal may monitor only the HRPD network if it is able to receive all 1X services of interest via the HRPD and IMS networks. The terminal may monitor both 1X and HRPD networks if it is unable to receive all 1X services of interest via the HRPD and IMS networks. The terminal may use the status of service-based registration with the IMS network and the capabilities of the HRPD network to select a suitable radio network from which to obtain each service of interest. HRPD capabilities may be quantified by the ability to provide the desired QoS for a service. For example, SMS may not require QoS and may be supported with a best effort flow. Voice service typically requires certain QoS and may be supported with a ProfileID 0x100 for a Real-time Transport Protocol (RTP) flow or a ProfileID 0x500 for a SIP flow. These ProfileIDs are specified in HRPD standard documents. The terminal may perform session configuration and configure QoS parameters for RTP and SIP flows upon acquiring an HRPD network. The terminal may thereafter communicate with the HRPD network for the RTP and SIP flows in accordance with the configured QoS parameters.

The terminal may transition between modes/states based on various criteria. The terminal may also temporarily leave a mode/state, perform an action, and return to the mode/state. Table 1 lists some operating scenarios for state diagram 300 in FIG. 3. In Table 1, "S" denotes system selection state 310, "H" denotes HRPD-only mode 320, "B" denotes 1X-HRPD mode 330, and "→" denotes a transition from one mode to another mode. The scenarios in Table 1 are described in further detail below.

TABLE 1

| Scenario | Mode | Description |
| --- | --- | --- |
| 1 | S → H/B | Initial power-up of the terminal |
| 2 | H | Temporary tune away to make 1X measurement for positioning |
| 3 | H → B | Loss of IMS registration |
| 4 | H → B | Moving from HRPD Rev A coverage to HRPD Rev 0 coverage |
| 5 | H → B | Loss of HRPD coverage |
| 6 | H → B | Moving to HRPD coverage edge |
| 7 | B → H | Moving into good HRPD coverage |
| 8 | H → H/B | Receive trigger to originate a call on 1X network |
| 9 | H → H/B | Handoff from HRPD network to 1X network |

For scenario 1, the terminal is powered up and determines whether to operate in the HRPD-only mode or the 1X-HRPD mode. The terminal may perform system selection based on predetermined rules. If an HRPD network is acquired, then the terminal may determine whether the HRPD network supports the QoS profiles of the terminal and, if so, perform session negotiation/configuration to configure QoS parameters for the 1X services of interest. If QoS configuration is successful, then the terminal may perform registration with the IMS network for the 1X services of interest. The terminal may operate in the HRPD-only mode if the IMS network supports the 1X services of interest and IMS registration is successful. The terminal may perform 1X power-down registration if it is registered with the ANSI-41 network when operating in the HRPD-only mode.

The terminal may operate in the 1X-HRPD mode if (a) an HRPD network is not acquired, (b) an HRPD Rev A network is acquired but does not support all 1X services of interest, or (c) an HRPD Rev 0 network is acquired. For case (a), the terminal may periodically search for an HRPD network. For case (b), the terminal may perform IMS registration if at least one service of interest can be obtained via the HRPD and IMS networks. For cases (b) and (c), the terminal may operate in an extended sleep mode if there is no IMS capability and mobile-terminated service requirement on the HRPD network. For all three cases, the terminal may perform 1X power-up registration if it is not already registered with the ANSI-41 network and may monitor both 1X and HRPD networks.

In general, the terminal may be registered with the IMS and/or ANSI-41 network. The terminal may be registered in both the IMS and ANSI-41 networks if at least one 1X service of interest is not available via the HRPD and IMS networks and at least one IMS service may be obtained via the HRPD and IMS networks.

For scenario 2, the terminal is in the HRPD-only mode and is instructed to make 1X pilot phase measurements for positioning. These measurements may be used to perform a search for GPS satellites, to derive a position estimate for the terminal using Advance Forward Link Trilateration (AFLT) or some other positioning method, to augment GPS measurements when an insufficient number of GPS satellites are available so that a position estimate can be derived with both GPS and pilot measurements, etc. The terminal may transition to the 1X-HRPD mode without impacting any pending High Priority Traffic (HPT) or idle operation on the HRPD network. The terminal may make 1X pilot phase measurements for base stations in the 1X network but may avoid access attempt, registration, and page response on the 1X network. If multiple receivers are available, then the terminal may tune one receiver to the HRPD network and use another receiver to make 1X measurements. The terminal returns to the HRPD-only mode after completing the 1X measurements.

For scenario 3, the terminal is in the HRPD-only mode and looses loses IMS registration (e.g., for VoIP). The terminal may transition to the 1X-HRPD mode and perform 1X power-up registration. The terminal may wait a predetermined amount of time from the loss of IMS registration to allow for completion of IMS recovery procedures, termination of the HRPD connection, etc., prior to performing 1X power-up registration. The terminal may thereafter monitor both 1X and HRPD networks but may be registered with only the ANSI-41 network.

For scenario 4, the terminal is in the HRPD-only mode and moves out of HRPD Rev A coverage into HRPD Rev 0 coverage. The HRPD network may initiate a change of the terminal's active personality from Rev A to Rev 0 after detecting the terminal moving into HRPD Rev 0 coverage. Upon sensing the personality change to HRPD Rev 0, the terminal may transition to the 1X-HRPD mode and perform 1X power-up registration with the ANSI-41 network, if available. The terminal may then perform de-registration of 1X services from the IMS network.

For scenario 5, the terminal is in the HRPD-only mode, looses loses HRPD coverage, and acquires an 1X network. The terminal may transition to the 1X-HRPD mode and perform 1X power-up registration with the ANSI-41 network. After successful 1X power-up registration, the terminal may send an SMS message to inform the IMS network that it is unable to receive any service via the HRPD network. Upon receiving this SMS message, the IMS network may (a) perform IMS de-registration for the terminal or (b) route voice and SMS messages to the ANSI-41 network but keep the terminal registered with the IMS network. The terminal may update its IMS registration status based on the known interpretation of the SMS message by the IMS network. The terminal may thereafter monitor the 1X network for pages and may periodically search for HRPD network. The terminal may receive services (e.g., voice, SMS, etc.) via the 1X network.

For scenario 6, the terminal is in the HRPD-only mode and moves to the edge of HRPD coverage. The terminal may determine that is at HRPD coverage edge based on a 1X neighbor list received from a base station in the HRPD network, weak HRPD pilot measurements, strong 1X pilot measurements, etc. The terminal may transition to the 1X-HRPD mode, perform 1X power-up registration with the ANSI-41 network, and perform de-registration with the IMS network to move 1X services to the ANSI-41 network. This may improve reliability of page reception for the terminal.

The pilot measurements made by the terminal may be for received signal quality, received power, etc. Received signal quality may be quantified by an energy-per-chip-to-total-received-power ratio (Ec/Io) or some other parameter and may be given in units of decibel (dB). Received power may be given in units of dBm. The terminal may filter the pilot measurements to improve the quality of the pilot measurements and avoid false trigger. The filtering may be based on a finite impulse response (FIR) filter, an infinite impulse response (IIR) filter, or some other type of filter. The filter may have a fixed response, which may be selected to provide good performance. The filter may also have a configurable response that may be selected based on measurement type (e.g., pilot Ec/Io, received power, etc.), radio network type (e.g., 1X or HRPD), operating scenario, etc.

In one design, the terminal detects HRPD coverage edge if any one of the following occurs:

HRPD pilot Ec/Io is less than an E1 threshold for T1 seconds,

HRPD received pilot power is less than a P1 threshold for T1 seconds,

HRPD pilot Ec/Io is less than an E2 threshold, or

HRPD received pilot power is less than a P2 power threshold.

The border conditions for the HRPD network may be met if any of the above criteria occurs. The strongest HRPD pilot received by the terminal, the pilot of the serving HRPD base station, and/or some other pilot may be used to detect for HRPD coverage edge. The thresholds and T1 timer may be any suitable values that can provide the desired performance. The thresholds and/or timer may also be different depending on whether the terminal is idle or has a pending call. The thresholds and/or timer may also be selected to provide hysteresis in order to avoid toggling between operational modes.

The terminal may be in the idle state when transitioning from the HRPD-only mode to the 1X-HRPD mode due to HRPD coverage edge. The terminal may perform registration and de-registration in a manner to reduce likelihood of missing pages during the transition.

The terminal may have a pending call in a non-HPT connected state (e.g., a packet data call) when it moves to HRPD coverage edge. The terminal may transition to the 1X-HRPD mode in a manner to maintain continuity of the pending call. The terminal may perform HRPD to 1X packet data hand down contemporaneous with the transition to the 1X-HRPD mode. The HRPD and 1X networks may exchange signaling to effectuate the hand down. The terminal may monitor the 1X network for signaling related to the hand down. The terminal may delay 1X power-up registration until the HRPD connection is closed.

For scenario 7, the terminal is in the 1X-HRPD mode and moves into good HRPD coverage. The terminal may determine that it is in good HRPD coverage based on non-reception of a 1X neighbor list from an HRPD base station, strong HRPD pilot measurements, etc. The terminal may have just acquired an HRPD Rev A network or moved from HRPD Rev 0 coverage to HRPD Rev A coverage. The terminal may have also moved to HRPD Rev A coverage edge, transitioned from the HRPD-only mode to the 1X-HRPD mode, and moved back into good HRPD Rev A coverage. In any case, the terminal may start session configuration and configure QoS parameters for RTP and SIP flows if these flows have not already been configured. If the QoS configuration is successful, then the terminal may perform IMS registration and elect to receive all 1X services of interest via the IMS network. If the IMS registration is successful, then the terminal may perform 1X power-down registration and thereafter monitor only the HRPD network. If the IMS registration is not successful, then the terminal may remain in the 1X-HRPD mode and continue to monitor both the 1X and HRPD networks for pages.

The terminal may filter the pilot measurements and/or use hysteresis in order to avoid prematurely performing IMS registration, which may be expensive in terms of signaling and radio resource utilization. The terminal may detect good HRPD coverage if the HRPD pilot Ec/Io exceeds an E3 threshold for T3 seconds, where E3 and T3 may be any suitable values. E3 and/or T3 may also be different depending on whether the terminal is idle or has a pending call.

The terminal may be in the idle state when transitioning from the 1X-HRPD mode to the HRPD-only mode. The terminal may perform registration and de-registration in a manner to reduce likelihood of missing pages during the transition.

The terminal may have a pending call in the non-HPT connected state when it moves into good HRPD coverage. The terminal may transition to the HRPD-only mode in a manner to maintain continuity of the pending call. The terminal may perform 1X to HRPD packet data hand up contemporaneous with the transition to the HRPD-only mode. The terminal may delay 1X power-down registration as well as operation in the HRPD-only mode until the 1X connection is closed.

For scenario 8, the terminal is in the HRPD-only mode and receives a trigger to originate a call on the 1X network. This trigger may result from a retry mechanism for a VoIP call failure on the HRPD network, an emergency call, an LCS or positioning related call, etc. The terminal may transition to the 1X-HRPD mode, acquire a 1X network based on system selection rules, and initiate a mobile-originated call on the 1X network. This call origination may result in implicit registration with the ANSI-41 network. The terminal may then communicate with the 1X and ANSI-41 networks for the call.

After completing the 1X call, the terminal may either remain in the 1X-HRPD mode or transition to the HRPD-only mode. The terminal may perform 1X power-down registration and transition to the HRPD-only mode if any one of the following occurs:

The same HRPD network is reacquired,

A different HRPD network is acquired and the previous data session is successfully restored, and A different HRPD network is acquired, the previous data session could not be restored, but QoS configuration for RTP and SIP flows in this HRPD network is successful.

The terminal may remain in the 1X-HRPD mode with dual IMS and ANSI-41 registration if it acquires a different HRPD network and could not transition to the HRPD-only mode because, e.g., QoS configuration is unsuccessful, the HRPD network is Rev 0 or does not support all 1X services of interest, etc. The terminal may perform IMS service de-registration or IMS registration depending on the terminal configuration, the service-based registration capability of the IMS network, etc. The terminal may retry QoS configuration and IMS registration at a later time and, if successful, transition to the HRPD-only mode.

The terminal may also remain in the 1X-HRPD mode if it does not acquire an HRPD network. The terminal may send an SMS message to indicate that it is not reachable via the HRPD and IMS networks. The IMS network may perform IMS de-registration for the terminal or may route voice and SMS pages to the ANSI-41 network but retain IMS registration for the terminal. The terminal may update its IMS registration status based on the known interpretation of this SMS message by the IMS network.

If the terminal fails to acquire a 1X network, fails to access the 1X network for 1X call retry, or fails call origination attempts, then the terminal may return to the HRPD-only mode.

For scenario 9, the terminal is in the HRPD-only mode, has an active call with the HRPD network, performs a handoff from the HRPD network to the 1X network, and transitions to the 1X-HRPD mode. The terminal may establish a new connection with the 1X network, drop the connection with the HRPD network, and either hand down the call or start a new call on the 1X network. The terminal may be registered with both the ANSI-41 and IMS networks.

The terminal may perform system selection after completing the 1X call. The terminal may (a) reacquire the same HRPD network, (b) acquire a different HRPD network and successfully restore the previous session, or (c) acquire a different HRPD network but cannot successfully restore the previous session. The terminal may remain in the 1X-HRPD mode if it is near HRPD coverage edge and may perform IMS de-registration of 1X services. The terminal may transition to the HRPD-only mode if it is in good HRPD coverage and may perform 1X power-down registration. The terminal may also perform the actions described above for after completing the 1X call in scenario 8.

The terminal may make pilot measurements for the 1X and/or HRPD networks when appropriate. For example, the terminal may start making pilot measurements for the HRPD network if the following occurs:

A 1X neighbor list is received from an HRPD base station, and either

The HRPD pilot Ec/Io is less than an E11 threshold for T11 seconds, or

The HRPD received pilot power is less than a P11 threshold for T11 seconds.

The terminal may stop making HRPD pilot measurements if the following occurs:

A 1X neighbor list is not received from an HRPD base station, or both

The HRPD pilot Ec/Io is greater than an E12 threshold for T12 seconds, and

The HRPD received pilot power is greater than a P12 threshold for T12 seconds.

The terminal may start making pilot measurements for base stations in the 1X neighbor list if the following occurs:

The HRPD pilot Ec/Io is less than an E13 threshold for T13 seconds, or

The HRPD received pilot power is less than a P13 threshold for T13 seconds.

The terminal may stop making pilot measurements for the base stations the 1X neighbor list if the following occurs:

The terminal stops making pilot measurements for the HRPD network,

The 1X pilot Ec/Io is less than an E14 threshold for T14 seconds, or

The 1X received pilot power is less than a P14 threshold for T14 seconds.

The terminal may also start or stop making pilot measurement for each radio network based on other criteria or other sets of criteria. Each of the above thresholds may be set to any suitable value. Each of the above timers may be set to zero or a suitable value. The thresholds and/or timers may also be selected to provide the desired performance and/or to achieve hysteresis.

The terminal may use the 1X and/or HRPD pilot measurements for various purposes such as to determine whether to register with the IMS and/or ANSI-41 network, to handoff from one radio network to another radio network, to transition between operational modes, etc. The use of the pilot measurements for some of the scenarios in Table 1 is described below.

For scenario 6, the terminal may transition from the HRPD-only mode to the 1X-HRPD mode if (a) either the HRPD pilot Ec/Io is less than an E21 threshold for T21 seconds or the HRPD received pilot power is less than a P21 threshold for T21 seconds, and (b) either the 1X pilot Ec/Io is greater than an E22 threshold for T22 seconds or the 1X received pilot power is greater than a P22 threshold for T22 seconds. The terminal may also transition to the 1X-HRPD mode if (a) either the HRPD pilot Ec/Io is less than an E23 threshold or the HRPD received pilot power is less than a P23 threshold, and (b) either the 1X pilot Ec/Io is greater than an E24 threshold or the 1X received pilot power is greater than a P24 threshold. If any of the above sets of criteria is met, then the terminal may be deemed to be in HRPD coverage edge. The terminal may then register with the ANSI-41 network and perform de-registration with the IMS network to move 1X services from the IMS network to the ANSI-41 network.

For scenario 7, the terminal may transition from the 1X-HRPD mode to the HRPD-only mode if (a) the HRPD pilot Ec/Io is greater than an E31 threshold for T31 seconds and/or (b) the HRPD received pilot power is greater than a P31 threshold for T31 seconds. The terminal may perform IMS registration for the 1X services of interest and may perform 1X power-down registration.

For scenario 9, the terminal may have a pending call with the HRPD network and may perform a hand down from the HRPD network to the 1X network if (a) the HRPD pilot Ec/Io is less than an E41 threshold for T41 seconds, and (b) either the 1X pilot Ec/Io is greater than an E42 threshold for T42 seconds or the 1X received pilot power is greater than a P42 threshold for T42 seconds. The terminal may continue the call on the 1X network after the hand down.

Figure 5:
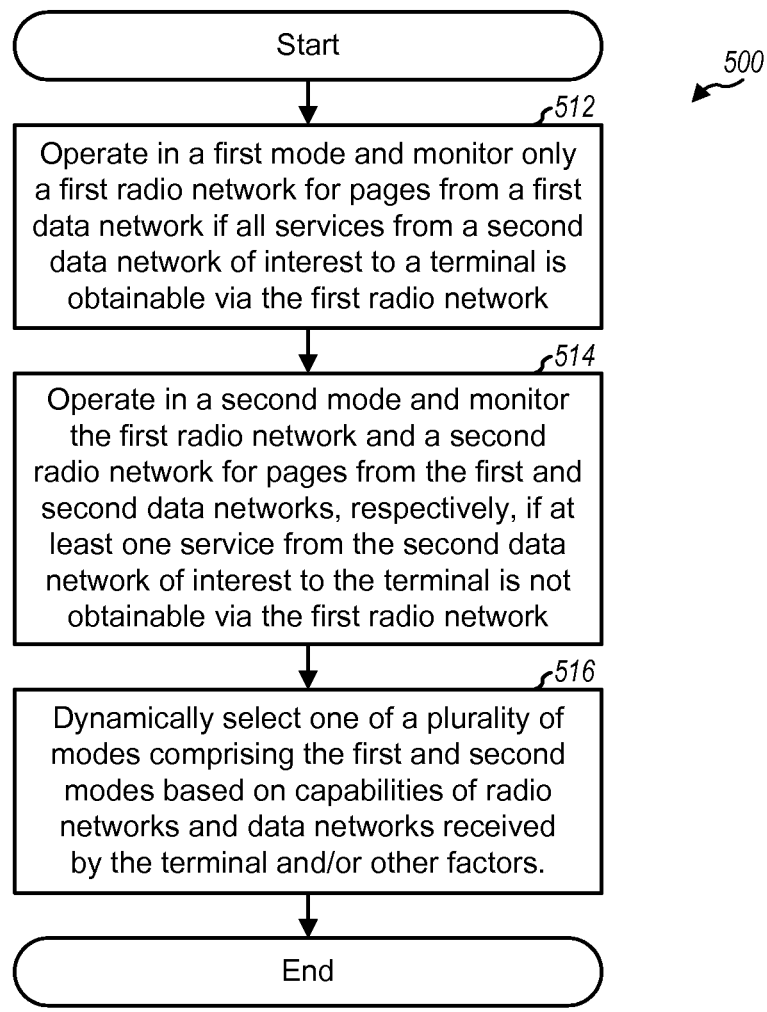
FIG. 5 shows a process for operating a terminal with multiple modes.

FIG. 5 shows a design of a process 500 for operating a terminal. The terminal operates in a first mode and monitors only a first radio network for pages from a first data network if all services from a second data network of interest to the terminal are obtainable via the first radio network (block 512). The terminal operates in a second mode and monitors the first radio network and a second radio network for pages from the first and second data networks, respectively, if at least one service from the second data network of interest to the terminal is not obtainable via the first radio network (block 514). The terminal may dynamically select one of a plurality of modes comprising the first and second modes based on capabilities of radio networks and data networks received by the terminal, services of interest to the terminal, requirements of the services of interest, and/or other factors (block 516).

The first radio network may be an HRPD network, and the second radio network may be a CDMA2000 1X network (or 1X network). The first data network may be an IMS network, and the second data network may be an ANSI-41 network.

The first mode may be an HRPD-only mode, and the second mode may be a 1X-HRPD mode. The first and second radio networks and the first and second data networks may also be other radio and data networks.

The services of interest to the terminal may include voice service, SMS, etc. The terminal may receive voice service via a VoIP call on the first radio network and via a circuit-switched call on the second radio network. The terminal may communicate with the first radio network for services from the first data network and with the second radio network for services from the second data network.

The terminal may register with only the first data network when operating in the first mode and with both the first and second data networks when operating in the second mode. The terminal may register with the first data network to obtain all services from the second data network of interest to the terminal via the first data network. The terminal may determine whether the first radio network is capable of providing the required QoS for all services of interest, determine whether all services of interest is supported by the first data network, and operate in the first mode if all services of interest is supported by the first data network and can be provided with the required QoS by the first radio network.

The terminal may operate as described above for various scenarios such as tuning away to make measurements for positioning, loss of registration with the first data network, loss of coverage of the first radio network, moving to coverage edge of the first radio network, moving into good coverage of the first radio network, originating a call with the second radio network, handoff from the first radio network to the second radio network, etc.

Figure 6:
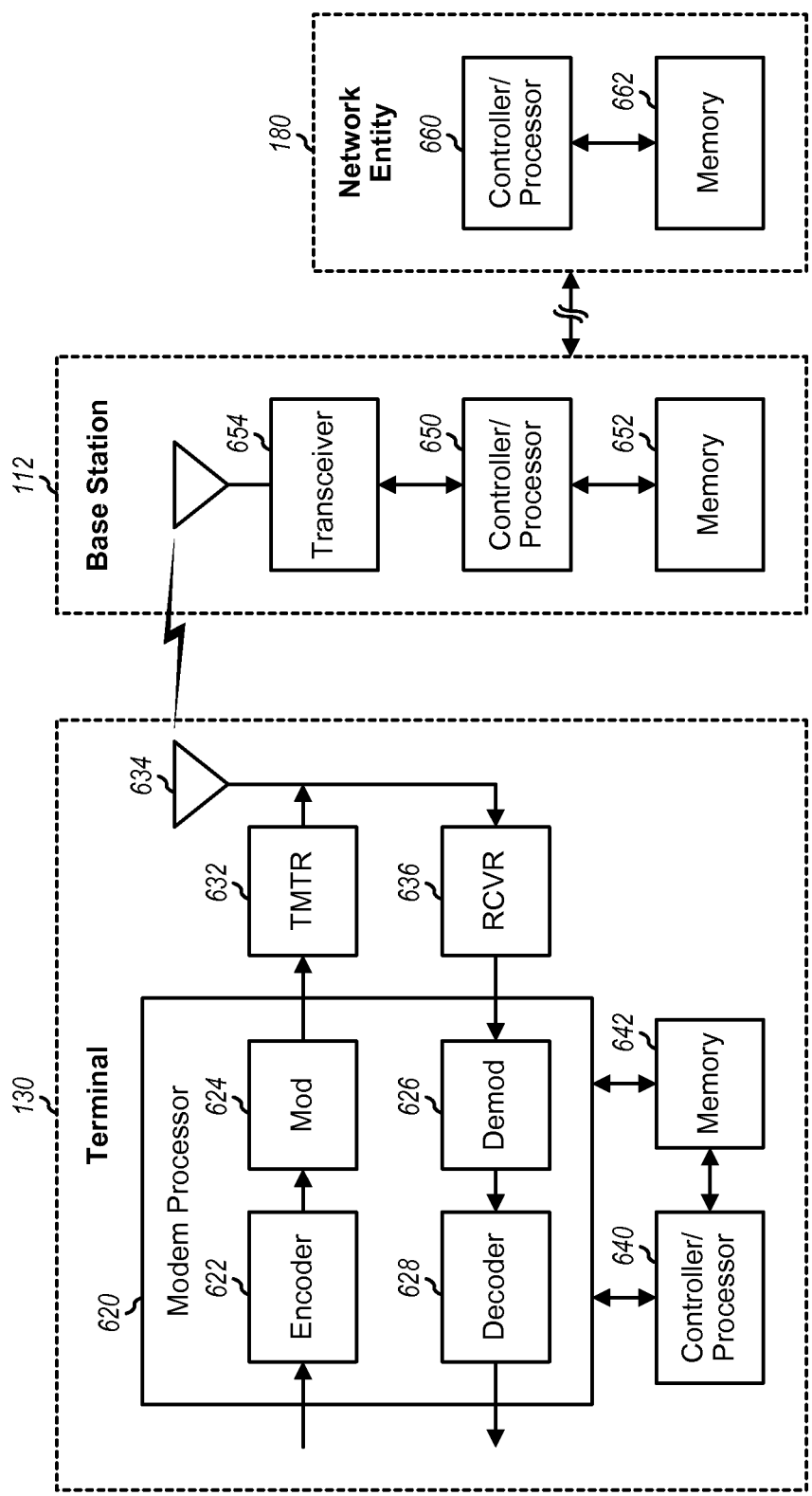
FIG. 6 shows a block diagram of a terminal and a base station.

FIG. 6 shows a block diagram of a design of terminal 130, base station 112, and a network entity 180. On the reverse link, data and signaling to be sent by terminal 130 are processed (e.g., formatted, encoded, and interleaved) by an encoder 622 and further processed (e.g., modulated, channelized, and scrambled) by a modulator (Mod) 624 to generate output chips. A transmitter (TMTR) 632 then conditions (e.g., converts to analog, filters, amplifies, and frequency upconverts) the output chips and generates a reverse link signal, which is transmitted via an antenna 634. On the forward link, antenna 634 receives forward link signals transmitted by base station 112 and/or other base stations. A receiver (RCVR) 636 conditions (e.g., filters, amplifies, frequency downconverts, and digitizes) the received signal from antenna 634 and provides samples. A demodulator (Demod) 626 processes (e.g., descrambles, channelizes, and demodulates) the samples and provides symbol estimates. A decoder 628 further processes (e.g., deinterleaves and decodes) the symbol estimates and provides decoded data. Encoder 622, modulator 624, demodulator 626, and decoder 628 may be implemented by a modem processor 620. These units perform processing in accordance with one or more radio technologies (e.g., 1X and/or HRPD) used by one or more radio networks with which terminal 130 is in communication.

A controller/processor 640 directs the operation of various units at terminal 130. Controller/processor 640 may perform process 500 in FIG. 5 and/or other processes to manage the operation of terminal 130. A memory 642 stores program codes and data for terminal 130, e.g., operational mode information, measurements used for transitioning between modes, etc.

FIG. 6 also shows a design of base station 112 in the HRPD network and network entity 180 in the IMS network. Base station 112 includes a controller/processor 650 that performs various functions for communication with the terminals, a memory 652 that stores program codes and data for base station 112, and a transceiver 654 that supports radio communication with the terminals. In general, a base station in the 1X or HRPD network may include one or more controllers/processors, memories, transceivers, etc.

Network entity 180 may be any entity or any collection of entities in the IMS network or the ANSI-41 network. Network entity 180 may support registration, paging of terminals, communication services, etc. Network entity 180 includes a controller/processor 660 that performs various functions supported by network entity 180 and a memory 662 that stores program codes and data for network entity 180.

The techniques described herein may be implemented by various means. For example, these techniques may be implemented in hardware, firmware, software, or a combination thereof. For a hardware implementation, the processing units used to perform dynamic operational mode management at a terminal may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

For a firmware and/or software implementation, the techniques may be implemented with modules (e.g., procedures, functions, and so on) that perform the functions described herein. The firmware and/or software codes may be stored in a memory (e.g., memory 642 in FIG. 6) and executed by a processor (e.g., processor 640). The memory may be implemented within the processor or external to the processor.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

The invention claimed is:

1. An apparatus comprising:
a processor configured to:
operate in a first mode and monitor only a first radio network for pages from a first data network in response to determining that all services from a second data network of interest to the apparatus are obtainable via the first radio network,
operate in a second mode and monitor both the first radio network and a second radio network for pages from the first data network and the second data network, respectively, in response to determining that at least one of the services from the second data network of interest to the apparatus is not obtainable via the first radio network,
detect that the apparatus is near an edge of a coverage area associated with the first radio network while operating in the first mode,
transition from the first mode to the second mode and start to monitor both the first radio network and the second radio network in response to detecting that the apparatus is near the edge of the coverage area associated with the first radio network, and
continue to monitor both the first radio network and the second radio network after acquiring the second radio network while the apparatus is near the edge of the coverage area associated with the first radio network; and
a memory coupled to the processor.

2. The apparatus of claim 1, wherein the processor is further configured to dynamically select one of a plurality of modes that include at least the first mode and the second mode based on capabilities of radio networks and data networks received by the apparatus.

3. The apparatus of claim 1, wherein the first radio network is a High Rate Packet Data (HRPD) network and the second radio network is a CDMA2000 1X network.

4. The apparatus of claim 1, wherein the first data network is an Internet Protocol Multimedia Subsystem (IMS) network and the second data network is an ANSI-41 network.

5. The apparatus of claim 1, wherein all the services from the second data network of interest to the apparatus comprise at least one of a voice service or a Short Message Service (SMS).

6. The apparatus of claim 1, wherein all the services from the second data network of interest to the apparatus comprise at least a voice service, and wherein the processor is further configured to:
receive the voice service via a Voice-over-IP (VoIP) call on the first radio network, and
receive the voice service via a circuit-switched call on the second radio network.

7. The apparatus of claim 1, wherein the processor is further configured to:
communicate with the first radio network for services from the first data network, and
communicate with the second radio network for services from the second data network.

8. The apparatus of claim 1, wherein the processor is further configured to:
register with only the first data network when operating in the first mode, and
register with both the first data network and the second data network when operating in the second mode.

9. The apparatus of claim 1, wherein the processor is further configured to:
determine whether the first radio network is capable of providing required quality of service (QoS) for all the services from the second data network of interest to the apparatus,
determine whether all the services from the second data network of interest to the apparatus are supported by the first data network, and
operate in the first mode in response to determining that all the services from the second data network of interest to the apparatus are supported by the first data network and the first radio network is capable of providing all the services from the second data network of interest to the apparatus with the required QoS.

10. The apparatus of claim 1, wherein the processor is further configured to:
perform service-base registration with the first data network to obtain all the services from the second data network of interest to the apparatus.

11. The apparatus of claim 1, wherein the processor is further configured to:
tune away from the first radio network to make measurements for the second radio network while operating in the first mode, and
return to the first radio network after making the measurements.

12. The apparatus of claim 11, wherein the measurements are for pilots from base stations in the second radio network and are used for positioning.

13. The apparatus of claim 1, wherein the processor is further configured to:
transition from the first mode to the second mode upon losing registration with the first data network, and
register with the second data network in response to determining that the second data network is available.

14. The apparatus of claim 13, wherein the processor is further configured to:
wait a predetermined amount of time after losing registration with the first data network before registering with the second data network.

15. The apparatus of claim 1, wherein the processor is further configured to:
detect loss of coverage of the first radio network while operating in one or more of the first mode or the second mode,
transition to a third mode in response to detecting the loss of coverage, and
register with the second data network in response to determining that the second data network is available.

16. The apparatus of claim 15, wherein the processor is further configured to:
monitor only the second radio network for pages from the second data network while operating in the third mode.

17. The apparatus of claim 15, wherein the processor is further configured to:
send a message to inform the first data network of an inability to receive services via the first radio network in response to detecting the loss of coverage.

18. The apparatus of claim 1, wherein the processor is further configured to:
receive from a base station in the first radio network a list of neighbor base stations in the second radio network, and
detect that the apparatus is near the edge of the coverage area associated with the first radio network based on the list of neighbor base stations received from the base station in the first radio network.

19. The apparatus of claim 1, wherein the processor is further configured to:
detect that the apparatus is near the edge of the coverage area associated with the first radio network based on one or more of a list of neighbor base stations in the second radio network received from a base station in the first radio network or channel conditions of the first radio network.

20. The apparatus of claim 1, wherein the processor is further configured to detect that the apparatus is near the edge of the coverage area associated with the first radio network based on at least one of whether:
received pilot signal quality for the first radio network is less than a first threshold for a predetermined time period,
received pilot power for the first radio network is less than a second threshold for the predetermined time period,
the received pilot signal quality for the first radio network is less than a third threshold, or
the received pilot power for the first radio network is less than a fourth threshold.

21. The apparatus of claim 1, wherein the processor is further configured to:
transfer a call from the first radio network to the second radio network in response to the transition from the first mode to the second mode.

22. The apparatus of claim 1, wherein the processor is further configured to:
- detect coverage of the first radio network while operating in the second mode, and
- transition from the second mode to the first mode and monitor only the first radio network in response to detecting the coverage of the first radio network.

23. The apparatus of claim 22, wherein the processor is further configured to:
- detect the coverage of the first radio network based on one or more of non-reception of a list of neighbor base stations in the second radio network or channel conditions of the first radio network.

24. The apparatus of claim 1, wherein the processor is further configured to:
- receive an indication to originate a call on the second radio network while operating in the first mode,
- transition to the second mode in response to the indication to originate the call on the second radio network, and
- originate the call on the second radio network.

25. The apparatus of claim 24, wherein the indication is due to one or more of failure to originate the call on the first radio network, the call being an emergency call, or the call being for one or more of location services or positioning.

26. The apparatus of claim 1, wherein the processor is further configured to:
- operate in the first mode at a start of a call,
- perform handoff from the first radio network to the second radio network during the call, and
- operate in the second mode at a termination of the call.

27. The apparatus of claim 1, wherein the processor is further configured to:
- detect that the apparatus has moved back into the coverage area associated with the first radio network after the transition from the first mode to the second mode, and
- remain in the second mode and continue to monitor both the first radio network and the second radio network in response to determining that registration with the first data network failed for at least one of the services from the second data network of interest to the apparatus.

28. An apparatus comprising:
a processor configured to:
operate in a first mode and monitor only a High Rate Packet Data (HRPD) network for pages from an Internet Protocol Multimedia Subsystem (IMS) network in response to determining that all services from an ANSI-41 network of interest to the apparatus are obtainable via the HRPD network,
operate in a second mode and monitor both the HRPD network and a CDMA2000 1X network for pages from the IMS network and the ANSI-41 network, respectively, in response to determining that at least one of the services from the ANSI-41 network of interest to the apparatus is not obtainable via the HRPD network,
detect that the apparatus is near an edge of a coverage area associated with the HRPD network while operating in the first mode,
transition from the first mode to the second mode and start to monitor both the HRPD network and the CDMA2000 1X network in response to detecting that the apparatus is near the edge of the coverage area associated with the HRPD network, and
continue to monitor both the HRPD network and the CDMA2000 1X network after acquiring the CDMA2000 1X network while the apparatus is near the edge of the coverage area associated with the HRPD network; and
a memory coupled to the processor.

29. A method comprising:
operating in a first mode and monitoring only a first radio network for pages from a first data network in response to determining that all services from a second data network of interest to a terminal are obtainable via the first radio network;
operating in a second mode and monitoring both the first radio network and a second radio network for pages from the first data network and the second data network, respectively, in response to determining that at least one of the services from the second data network of interest to the terminal is not obtainable via the first radio network;
detecting that the terminal is near an edge of a coverage area associated with the first radio network while operating in the first mode;
transitioning from the first mode to the second mode and starting to monitor both the first radio network and the second radio network in response to detecting that the terminal is near the edge of the coverage area associated with the first radio network; and
continuing to monitor both the first radio network and the second radio network after acquiring the second radio network while the terminal is near the edge of the coverage area associated with the first radio network.

30. The method of claim 29, further comprising:
dynamically selecting one of a plurality of modes that include at least the first mode and the second mode based on capabilities of radio networks and data networks received by the terminal.

31. The method of claim 29, further comprising:
detecting loss of coverage of the first radio network while operating in one or more of the first mode or the second mode;
transitioning to a third mode in response to detecting the loss of coverage;
registering with the second data network in response to transitioning to the third mode; and
monitoring only the second radio network for pages from the second data network while operating in the third mode.

32. An apparatus comprising:
means for operating in a first mode and monitoring only a first radio network for pages from a first data network in response to determining that all services from a second data network of interest to the apparatus are obtainable via the first radio network;
means for operating in a second mode and monitoring both the first radio network and a second radio network for pages from the first data network and the second data network, respectively, in response to determining that at least one of the services from the second data network of interest to the apparatus is not obtainable via the first radio network;
means for detecting that the apparatus is near an edge of a coverage area associated with the first radio network while operating in the first mode;
means for transitioning from the first mode to the second mode and starting to monitor both the first radio network and the second radio network in response to detecting that the apparatus is near the edge of the coverage area associated with the first radio network; and means for continuing to monitor both the first radio network and the second radio network after acquiring the second radio network while the apparatus is near the edge of the coverage area associated with the first radio network.

33. The apparatus of claim 32, further comprising:

means for dynamically selecting one of a plurality of modes that include at least the first mode and the second mode based on capabilities of radio networks and data networks received by the apparatus.

34. A terminal comprising:

a processor configured to:

operate in a first mode and monitor only a first radio network for pages from a first data network if in response to determining that all services from a second data network of interest to the terminal are obtainable via the first radio network, operate in a second mode and monitor both the first radio network and a second radio network for pages from the first data network and the second data network, respectively, in response to determining that at least one of the services from the second data network of interest to the terminal is not obtainable via the first radio network, detect that the terminal is near an edge of a coverage area associated with the first radio network while operating in the first mode, transition from the first mode to the second mode and start to monitor both the first radio network and the second radio network in response to detecting that the terminal is near the coverage area associated with the first radio network, and continue to monitor both the first radio network and the second radio network after acquiring the second radio network while the terminal is near the edge of the coverage area associated with the first radio network; and a memory coupled to the processor.

35. The terminal of claim 34, wherein the processor is further configured to:

dynamically select one of a plurality of modes that include at least the first mode and the second mode based on capabilities of radio networks and data networks received by the terminal.

36. A computer program product, comprising:

a non-transitory computer-readable medium comprising:

code for causing a computer to operate in a first mode and monitor only a first radio network for pages from a first data network in response to determining that all services from a second data network of interest to a terminal are obtainable via the first radio network;

code for causing the computer to operate in a second mode and monitor both the first radio network and a second radio network for pages from the first data network and the second data network, respectively, in response to determining that at least one of the services from the second data network of interest to the terminal is not obtainable via the first radio network;

code for causing the computer to detect that the terminal is near an edge of a coverage area associated with the first radio network while operating in the first mode;

code for causing the computer to transition from the first mode to the second mode and start to monitor both the first radio network and the second radio network in response to detecting that the terminal is near the edge of the coverage area associated with the first radio network; and code for causing the computer to continue to monitor both the first radio network and the second radio network after acquiring the second radio network while the terminal is near the edge of the coverage area associated with the first radio network.

37. The computer program product of claim 36, wherein the non-transitory computer-readable medium further comprises:

code for causing the computer to dynamically select one of a plurality of modes that include at least the first mode and the second mode based on capabilities of radio networks and data networks received by the terminal.

\* \* \* \* \*